Oct. 27, 1925.
E. BURDICK
BEET HARVESTER
Filed July 13, 1922
1,559,501
3 Sheets-Sheet 1
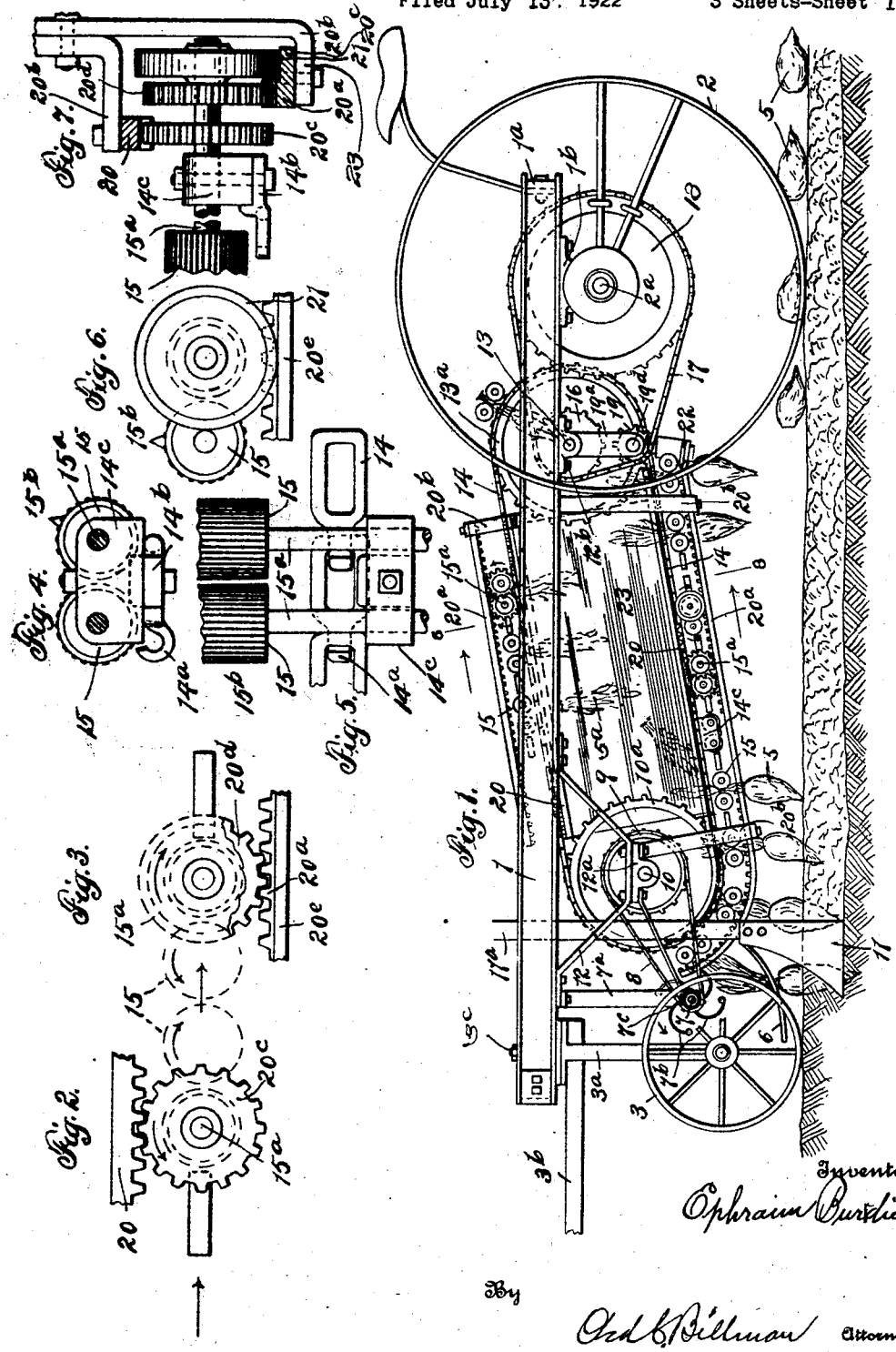
Inventor
Ephraim Burdick
By
Ord E. Billman Attorney

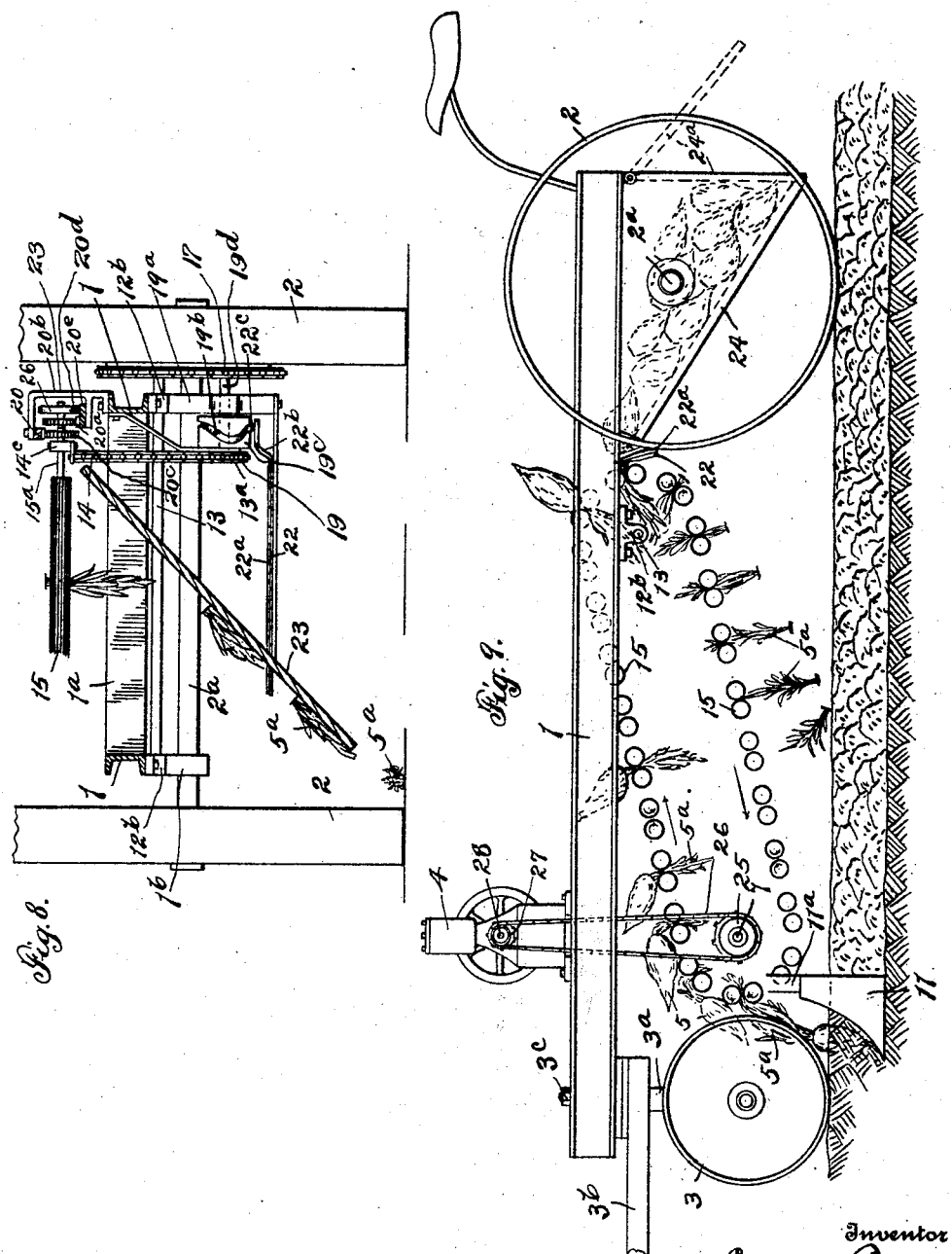

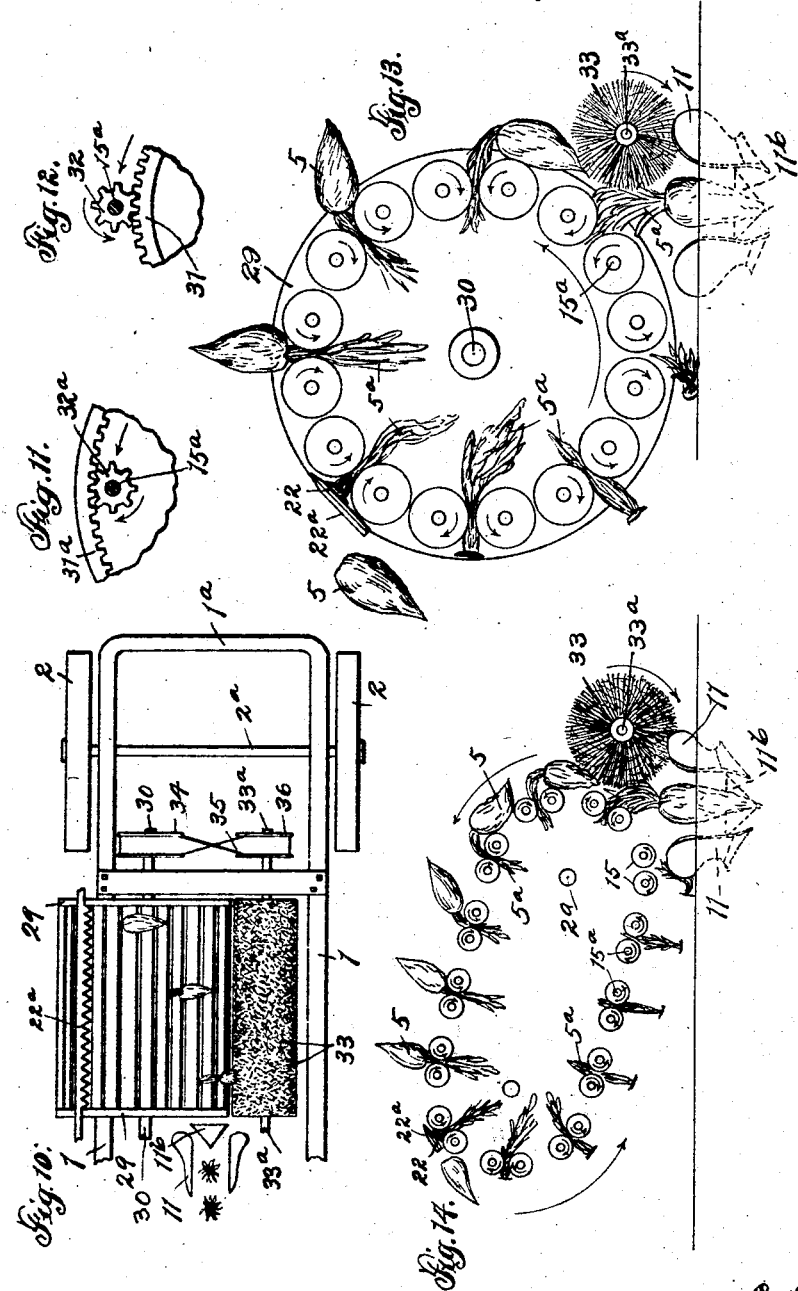

Patented Oct. 27, 1925.

1,559,501

UNITED STATES PATENT OFFICE.

EPHRAIM BURDICK, OF MADISON, OHIO, ASSIGNOR OF ONE-HALF TO ULYSSIS A. EATO, OF CLEVELAND, OHIO.

BEET HARVESTER.

Application filed July 13, 1922. Serial No. 574,712.

*To all whom it may concern:*

Be it known that I, EPHRAIM BURDICK, a citizen of the United States, residing at Madison, in the county of Lake and State of Ohio, have invented certain new and useful Improvements in Beet Harvesters, of which the following is a specification.

My invention relates to improvements in vegetable or beet harvesting machines, and more particularly to that class or type in which the vegetables or beets are initially loosened in the soil by means of special beet lifting and pulling elements commonly known as "beet lifters."

In the present embodiment of the invention improved means are provided adapted to cooperate with the beet lifting mechanism whereby the bodies of the vegetables or beets are further supported and lifted through the medium of improved vegetable or beet top engaging mechanism and a suitable carrier or conveyer mechanism adapted to properly support and position the untopped vegetables or beets in cooperative relation to suitable top severing mechanism, suitable means being also provided whereby the topped body of the beet or vegetable is delivered or deposited in a suitable manner either in rows upon the ground or in receptacles carried by the machine, as desired, and whereby the tops when severed are likewise delivered to a suitable place of deposit.

The primary object of the invention is to provide a generally improved harvester of the class or type indicated which will be exceedingly simple in construction, cheap of manufacture and efficient in use.

A further and very important object is the provision of improved beet lifting and top guiding and directing mechanism together with improved top engaging and conveyer mechanism adapted to move in a path in cooperative proximity to the beet lifting and top directing mechanism, suitable means being provided for causing such top engaging mechanism to engage the tops of the vegetables and lift the vegetables as engaged by said beet lifting and top directing mechanism and to convey the vegetables or beets in proper relative position to the top severing device after which the topped vegetables and severed tops are delivered to suitable places of deposit.

A still further object is the provision of improved top severing mechanism adapted not only to expeditiously and cleanly remove or sever the tops from the vegetables but to cooperate in an improved manner with the improved top engaging and vegetable holding mechanism.

A still further object is the provision of improved gearing or driving mechanism for operating the various parts in cooperative relation to each other and in which the liability to disarrangement or breakage of the parts is reduced to a minimum.

There are other features of the invention residing in elemental combinations and particular construction of parts, all as will hereinafter more fully appear.

With the above mentioned and other ends in view, the invention consists in the novel construction, arrangement and combination of parts, hereinafter described, illustrated in some of its embodiments in the accompanying drawings, and particularly pointed out in the appended claims.

Referring to the accompanying drawings, Figure 1 is a side elevation of a beet harvester constructed in accordance with this invention, some of the top engaging rollers in the endless carrier or conveyer and some of the spokes in the traction or driving wheels being removed for the purpose of clearer illustration of the parts.

Fig. 2, a fragmentary end elevation of a pair of vegetable top engaging rollers, illustrating in particular the arrangement of the driving rack and gears on the far side of same.

Fig. 3, a similar view of a pair of rollers illustrating the arrangement of the driving rack and gears on the near side of same.

Fig. 4, a detailed end view of one of the bearings links of the endless conveyer, together with a pair of top engaging rolls carried thereby.

Fig. 5, a fragmentary top plan view of the same.

Fig. 6, an end elevation of a pair of topping rollers detached from the endless conveyer or web and illustrating the geared shaft equipped with a conveyer supporting and guiding wheel.

Fig. 7, a fragmentary end elevation illustrating a modified form of driving gears and racks, in which the racks are arranged at one side only of the conveyer.

Fig. 8, a cross sectional view taken on line 8—8 of Fig. 1.

Fig. 9, a diagrammatic side elevation of a modified form of harvester in which the endless conveyer and top engaging rollers are driven in a reverse direction to that shown in Fig. 1 and in which the conveyer is driven by independent power means and the topped beets are deposited in a receiving receptacle or hopper instead of directly upon the ground as in the other figures of the drawings.

Fig. 10, a top plan view of a further modification in which the endless carrier is transversely movable and is in the specific form of transversely disposed rotatably mounted heads or ends supported upon and driven by a single longitudinally extending driving or axle shaft.

Fig. 11, a fragmentary view of suitable rack and pinion mechanism for driving the topping rolls.

Fig. 12, a similar view of the rack and gear mechanism for reversing the direction of rotation of the topping rolls for discharging the severed tops.

Fig. 13, an enlarged diagrammatic view of the form shown in Fig. 10, and illustrating in particular the cooperative relation and action of the transversely movable rotary carrier and top engaging rolls to the beet lifter and top guiding and directing mechanism.

Fig. 14, a similar view of a further modification in which the roller carrier is in the specific form of an endless transversely movable conveyer or web.

Similar numerals of reference designate like parts throughout all of the figures of the drawings.

The improved beet harvester comprises a suitable frame consisting, in the present instance, of longitudinally extending members 1, and transverse members 1ª, mounted on suitable wheels 2, at the rear and, in the present instance, provided with steering wheels 3, at the front, the latter being mounted on a steering truck 3ª, and when drawn by draft animals provided with a tongue or draft pole 3ᵇ. The steering or tongue supporting truck 3ª is pivotally mounted at 3ᶜ. If desired, the wheels 2 may be mounted on an axle shaft 2ª, said axle shaft 2ª being mounted, in the present instance, in bearing blocks 1ᵇ, beneath the rear end of the longitudinal frame members 1.

The ground wheels 2 may be either in the specific form of traction or driving wheels, as shown in Figs. 1 and 8 of the drawings, or, if desired, such wheels may be merely in the form of sustaining wheels in which instance the endless conveyer or carrier and the top engaging and top severing mechanism are driven by independent driving or motive power, such for example,—as the independent motor or engine 4, shown in Fig. 9 of the drawings.

As a means of directing or guiding the vegetable or beet tops 5ª, of the vegetable bodies or beets 5, in cooperative relation to the beet lifting mechanism, hereinafter referred to, and the top engaging and carrier or conveyer mechanism, hereinafter referred to, the front portion of the vehicle or machine frame may be provided with forwardly extending and inclined and rearwardly converging guide rods or fingers 6, adapted to extend in advance of the beet lifter and to engage beneath and elevate any downturned tops while the machine moves forwardly, and as a means of further directing such beet tops 5ª upwardy and rearwardly to facilitate the engagement of such beet tops by the top engaging mechanism carried by the conveyer or carrier, the machine may be provided with a transverse driving shaft 7, carried on suitable brackets 7ª, said shaft being provided with curved top engaging and directing arms 7ᵇ, adapted to engage with the tops and direct the same upwardly substantially as shown in Fig. 1 of the drawings. The rotary top guiding and directing device made up of the arms 7ᵇ may be driven in any suitable and convenient manner, as for example,— by means of a sprocket 7ᶜ, provided with a sprocket chain 8, leading to a second sprocket wheel 9, arranged on the front carrier or conveyer shaft 10, as shown in Fig. 1 of the drawings.

The improved beet lifter may be of any suitable and convenient form, as for example,—suitable side plows or shares 11, adapted to be adjusted in a suitable and convenient manner through the medium of the supporting stem or beam 11ª, slidably mounted in the front end of the machine frame. If desired, the side plows 11 may take the specific form shown in Figs. 10, 13 and 14 of the drawings and in which instance, if desired, such side plows may be supplemented by means of a sub surface plow or lifter blade 11ᵇ, cooperating in a well understood manner for loosening the soil about the beets and lifting the latter in cooperation with the top guiding and top engaging mechanism, hereinafter described, for carrying the beets in proper relation to the top severing device.

Referring now to the improved vegetable engaging and carrying and conveyer mechanism, it should be understood that the carrier may either take the specific form of an endless conveyer or web adapted to carry the top engaging rollers, as shown in Figs. 1, 8, 9 and 14 of the drawings, or such carrier may be in the specific form of a rotatable mounted cylinder or drum, as shown in Figs. 10 and 13 of the drawings.

Referring now to the endless conveyer or web form of device shown in Figs. 1, 8, 9 and 14 of the drawings it will be seen that the frame is adapted to support through the medium of suitable brackets 12, and bearing blocks 12$^a$, the said front conveyer shaft 10 and through the medium of suitable bearing blocks 12$^b$, a second transverse conveyer shaft 13, said front and rear conveyer shafts 10 and 13 being each provided with a pair of sprocket wheels 10$^a$ and 13$^a$, respectively, the latter carrying endless conveyer chains 14, the latter being made up of a suitable number of properly spaced links 14$^a$ provided with laterally extending brackets or extensions 14$^b$, (see Fig. 7) adapted to carry suitable bearing blocks 14$^c$, to receive and carry the projecting bearing shafts 15$^a$, of the pairs of top engaging rollers 15. The top engaging rollers 15 are preferably provided on their outer peripheries with longitudinally corrugated resilient material 15$^b$, such as rubber or other suitable resilient material, to more effectively engage the tops for carrying and properly positioning the vegetables to the top severing device and for discharging the severed tops when severed.

As a means of driving the endless conveyer, the second conveyer shaft 13 may be provided with a sprocket wheel 16, adapted to receive motion from a sprocket chain 17, passing over a second sprocket wheel 18, on the axle shaft 2$^a$. If desired the sprocket chain 17 may pass over an idle sprocket 19, carried on a supporting bracket 19$^a$, extending downwardly from one of the side frame members 1.

As a means of causing the top engaging rollers 15 to revolve toward each other in pairs in proximity to the beet lifting and top directing mechanism to further lift and carry the vegetable or beet bodies in proper position to the top severing device and thereafter causing said rollers to revolve in an opposite direction to discharge the severed tops, the frame may be provided with spaced racks 20 and 20$^a$, respectively, mounted in suitable relation by means of bracket members 23, extending downwardly from suitable parts of the vehicle or machine frame, said upper and lower racks 20 and 20$^a$ being adapted to engage with the inner and outer gears 20$^c$ and 20$^d$, respectively, on the relatively short and long bearing shafts 15$^a$ of the pairs of top engaging rollers 15, as shown most clearly in Figs. 8 and 7 of the drawings.

The lower rack 20$^a$ may be provided with a trackway 20$^e$, to support a supporting wheel 21, on the relatively longer shaft of the pairs of rollers, said wheel 21 being located just outside of the outer gear 20$^d$ and being adapted to guide and support the endless conveyer or web in proper relative position to the racks 20 and 20$^a$.

As a means of revolving said rollers 15 in an opposite direction to discharge the severed tops, the inner and outer positions of the racks 20 and 20$^a$ are merely reversed in the opposite path of the conveyer, the outwardly located rack 20$^a$ being set in to engage the inner gear 20$^c$ and the upper and inwardly located rack 20 being then located outwardly to engage the outer gear 20$^d$ thereby reversing the direction of rotation of the rollers and discharging the cut tops as shown.

The top severing device may be of any suitable and convenient form and be located at such position relative to the endless conveyer or carrier and the top engaging rollers as to deposit the topped vegetables or beets at any desired place of deposit. Such top severing device may comprise relatively fixed and movable members 22 and 22$^a$, respectively, arranged in the form of knives adapted to give a shear or draw cut on the vegetable tops, the reciprocatory knives or members 22$^a$ being mounted on a bar 22$^b$, receiving its reciprocatory movement through suitable operating mechanism, as for example,—a roller 22$^c$, adapted to ride within and be driven by a cam slot 19$^b$, in a rotary member 19$^c$, carried on a shaft 19$^d$, mounted in the bracket 19$^a$ and driven by the sprocket 19, as shown in Fig. 8 of the drawings.

In the form shown in Figs. 1 and 8 of the drawings the vegetables or beets when severed from their tops by the top severing device are permitted to drop down upon the ground and the severed beet tops 5$^a$ are discharged upon an inclined laterally extending chute 23, leading to one side of the machine, as shown most clearly in Fig. 8 of the drawings. If desired, however, the direction of travel of the endless conveyer may be reversed and the arrangement of the racks 20 and 20$^a$ may be correspondingly reversed whereby such top engaging rollers 15 will be reversed in such relation to the beet lifting and top directing mechanism as to lift the untopped beets upwardly and over the upper pass of the endless conveyer carrying the untopped vegetables rearwardly to a top severing device at the rear so that the topped beets will be deposited in a hopper or receptacle 24, at the rear, as shown in Fig. 9 of the drawings, and in which instance a door 24$^a$ will permit of the dumping of the accumulated beets from time to time in piles upon the ground or into a convenient receptacle. In this instance, if desired, the endless conveyer or web may be independently driven through a sprocket wheel 25, on the front conveyer shaft 7 and a sprocket chain 26, leading to a second sprocket wheel 27, on a driving or crank shaft 28, on the motor or engine shaft 4.

In the form shown in Figs. 10 and 13 of the drawings, the endless transversely movable carrier is in the specific form of circular or disc shaped heads 29, mounted on a common driving axle 30, and the longitudinally extending top engaging elements or rollers 15 are mounted in and carried by the heads 29, the requisite motion being imparted to the rollers by means of relatively fixed concentrically mounted circular or ring shaped inner and outer racks 31 and 31$^a$, adapted to engage with pinion 32 and 32$^a$, as shown in the drawings. In this form of the invention the top guiding and directing mechanism preferably includes a rotary mounted longitudinally extending brush 33, mounted to extend at one side of the cylindrical or drum shaped carrier and extending from the beet lifter, as shown most clearly in Figs. 10 and 13 of the drawings, and in a modified form of endless conveyer in Fig. 14 of the drawings.

By the term "beet" as herein used and wherever set forth in the appended claims is meant to include any vegetable of a related or analogous character provided with a top and having characteristics adapting it to be harvested by a machine of this general character, it being obvious that the principles of this harvester may be readily altered or conformed to meet varying conditions of vegetables having a bulb or body portion and a top portion.

In the form shown in Figs. 10 and 13 of the drawings, the driving axle 30 of the carrier may be either independently driven by a separate motor or engine in the manner suggested in Fig. 9 of the drawings, or may be provided with suitable gearing connected to the supporting wheels 2 and it will be seen that the driving axle 30 (see Fig. 10) is provided with a pulley 34, carrying a belting 35, passing over a second pulley 36, mounted on one end of the brush carrying axle 33$^a$ whereby the brush 33 is driven in suitable cooperative relation to the top engaging rollers 15 and the beet lifting and top directing mechanism.

Having thus described some of the embodiments of my invention, without having attempted to set forth all the forms in which it may be made, or all the modes of its use, what I claim and desire to secure by Letters Patent, is—

1. In a vegetable harvester, including vegetable lifting and top guiding mechanism, vegetable top engaging roller elements, and means for actuating said vegetable top engaging roller elements in reverse direction.

2. In a vegetable harvesting machine, including vegetable lifting and top guiding mechanism, roller and carrier means for engaging and carrying said vegetables through their tops, means for driving the rollers in a reverse direction and means for severing said vegetables.

3. In a vegetable harvester, including vegetable lifting and topping mechanism, top engaging and vegetable carrying roller and carrier elements, and means for actuating said roller elements to in one direction position the vegetables and tops to the said topping mechanism and in a reverse direction for thereafter discharging the severed tops.

4. In a vegetable harvester, a harvester frame, beet lifting and top guiding mechanism, an endless carrier including vegetable top engaging roller mechanism, a vegetable top severing device, and means for driving said carrier and top engaging roller mechanism and causing the latter to release the severed tops by reverse movement given to the roller mechanism.

5. In a vegetable harvesting machine, including vegetable lifting and top guiding mechanism, top engaging roller and carrier means cooperating with such vegetable lifting and top guiding mechanism for carrying said vegetables through their engaged tops, and means for severing said vegetables from the engaged tops held by said roller and carrier mechanism, and means for then discharging the tops by reverse movement given to the top engaging rollers.

6. In a vegetable harvester, including vegetable lifting and topping mechanism, a carrier including relatively and independently movable top engaging elements, means for actuating the latter and said carrier to position the vegetables relative to the said topping mechanism, and means for releasing the severed tops from said top engaging elements by reverse movement given to the latter.

7. In a vegetable harvester, a wheeled harvester frame, means for lifting and guiding the vegetables and tops, respectively, a carrier provided with independently actuated relatively movable coacting means for engaging said vegetable tops and carrying said vegetables thereby, and means for severing said vegetables from the tops as held by said top engaging mechanism, and means for giving reverse movement to the top engaging means.

8. In a vegetable harvester, a harvester frame provided with beet lifting and top guiding mechanism, an endless carrier including independently actuated relatively movable vegetable top engaging elements, means for driving said endless carrier, a vegetable top severing device, and means for causing said vegetable top engaging elements to engage and hold the vegetable tops and vegetables and means for reversing the motion of said top engaging elements to release the severed tops at predetermined points in the travel of said endless carrier.

9. In a vegetable harvesting machine, including vegetable lifting and top severing mechanism, an endless carrier including top engaging rotary elements, means for rotating the latter to carry and finally position the vegetables and tops to the top severing mechanism, and means for rotating said top engaging rotary elements in a reverse direction to discharge the cut tops therefrom.

10. In a beet harvester, the combination with beet pulling and beet top guiding mechanism; of an endless carrier having relatively movable top engaging elements. means for driving said endless carrier, a top severing device, and means for causing said relatively movable elements to move toward each other and away from said beet lifting and top guiding mechanism, and means for reversing the direction of rotation of said elements to discharge the tops therefrom.

11. In a vegetable harvesting machine, including vegetable lifting and top severing mechanism, an endless carrier including top engaging rollers, means for rotating the latter toward each other to carry and finally position the vegetables and tops to the top severing mechanism, and means for rotating said top engaging elements in a reverse direction to discharge the cut tops therefrom.

12. In a vegetable harvester, including vegetable lifting and vegetable top guiding and directing mechanism, a carrier having relatively movable vegetable top engaging and vegetable supporting elements in cooperative relation to each other and to said vegetable lifting and top guiding and directing mechanism, and means for detaching the vegetables from the tops as the latter are held by said top engaging and vegetable supporting elements, means for discharging the severed tops by a reverse movement of the latter.

13. In a beet harvester, a vehicle frame provided with adjustable beet lifting mechanism, an endless carrier including top engaging rollers, means for driving said endless carrier, a top severing device, means for causing said rollers to revolve toward each other in pairs away from said beet lifting mechanism to engage the tops of the beets as lifted by said beet lifting mechanism and means for revolving said rollers in a reverse direction to discharge the severed tops.

14. In a beet harvester, a vehicle frame, a pair of beet lifters adjustable thereon, an endless conveyer provided with top engaging rollers, means for driving said endless conveyer, a top severing device, and means for causing said rollers to revolve toward each other to engage the tops and lift the beets from the beet lifters and hold the same in proper position relative to said top severing device, and means for revolving said rollers in an opposite direction to discharge the severed tops therefrom.

15. In a beet harvester, the combination with beet pulling and beet top directing mechanism; of an endless conveyer having top engaging rollers, means for driving said endless conveyer, a top severing device in proximity to the latter, means for causing said rollers to revolve toward each other in pairs in proximity to said beet lifting and top directing mechanism, and means for revolving said rollers in an opposite direction to discharge the severed tops after said tops and beets are severed by said top severing device.

16. In a beet harvester, a vehicle frame provided with an adjustable beet lifting device, an endless conveyer including top engaging rollers arranged in pairs, means for driving said endless conveyer, a top severing device in proximity to said endless conveyer, means for causing said rollers to revolve toward each other in pairs in proximity to said beet lifting mechanism to engage the tops of the beets as loosened and lifted by said beet lifting device, and means for revolving said rollers in an opposite direction to discharge the severed tops.

17. In a beet harvester, a vehicle frame provided with beet lifting and top directing mechanism, a plurality of top engaging rollers adapted to move in a path in cooperative proximity to said beet lifting and top directing mechanism, means for causing said rollers to move in top engaging relation to engage said tops and lift said beets as engaged by said beet lifting and top directing mechanism, respectively, a top severing device in proximity to said rollers, and means for moving said rollers in pairs in a reverse direction to discharge said tops when the latter are severed by said top severing device.

18. A beet harvester, comprising a vehicle frame, a pair of beet lifters adjustable thereon, an endless conveyer provided with top engaging rollers in cooperative relation to said beet lifters, means for driving said endless conveyer, a top severing device, means for causing said rollers to revolve toward each other in proximity to said beet lifters to engage the tops and lift the beets when loosened by said beet lifters, means for rotating said rollers for positioning said beets in proper relation to the top severing device, and means for revolving such rollers in a reverse direction to discharge the severed tops therefrom.

19. In a beet harvester, a vehicle frame provided with beet lifting and longitudinally extending rotary top directing mechanism, and endless conveyer including longitudinally extending top engaging rollers arranged in pairs, means for driving said endless conveyer, top severing means in proximity to said endless conveyer, means for driving said top severing means, and means for causing said rollers to revolve toward each other in pairs in proximity to said beet lifting and top directing mechanism to lift the beets from the same and carry the same in proper position to said top severing means.

20. In a vegetable harvesting machine, including vegetable lifting and longitudinally extending rotary top guiding mechanism, a transversely movable carrier provided with longitudinally extending top engaging elements in cooperative relation to said vegetable lifting and rotary top guiding mechanism for carrying and conveying the vegetables through the engaged tops.

21. In a vegetable harvester, including means for vertically lifting and longitudinally guiding the vegetables and tops, respectively, a carrier provided with longitudinally rotary elements in cooperative relation to said vegetable top guiding means for engaging the tops and carrying the vegetables thereby, and means for simultaneously driving said carrier and rotary top engaging elements.

In testimony whereof I have affixed my signature.

EPHRAIM BURDICK.